United States Patent [19]
Kwon

[11] Patent Number: 6,034,943
[45] Date of Patent: Mar. 7, 2000

[54] ADAPTIVE COMMUNICATION NODE FOR USE IN AN INTER-PROCESSOR COMMUNICATIONS SYSTEM

[75] Inventor: Hwan-Woo Kwon, Incheon, Rep. of Korea

[73] Assignee: Daewoo Telecom, Ltd., Incheon, Rep. of Korea

[21] Appl. No.: 08/980,006

[22] Filed: Nov. 26, 1997

[30] Foreign Application Priority Data

Dec. 10, 1996 [KR] Rep. of Korea ............ 96-63872

[51] Int. Cl.[7] ............... H04L 12/56; H04J 3/17; G06F 11/20
[52] U.S. Cl. .............. 370/219; 370/228; 370/395; 714/11
[58] Field of Search ............... 370/219, 220, 370/228, 395, 412, 413, 419, 465, 469; 714/11

[56] References Cited

U.S. PATENT DOCUMENTS

| | | | |
|---|---|---|---|
| 4,484,323 | 11/1984 | Beuscher et al. | 370/217 |
| 4,725,835 | 2/1988 | Schreiner et al. | 340/825.83 |
| 5,283,782 | 2/1994 | Takase et al. | 370/219 |
| 5,473,599 | 12/1995 | Li et al. | 370/219 |
| 5,475,675 | 12/1995 | Kondo et al. | 370/219 |
| 5,506,833 | 4/1996 | Nemoto | 370/228 |
| 5,508,997 | 4/1996 | Katou | 370/228 |
| 5,828,651 | 10/1998 | Jang et al. | 370/219 |

*Primary Examiner*—Hassan Kizou
*Assistant Examiner*—Saba Tsegaye
*Attorney, Agent, or Firm*—Pennie & Edmonds LLP

[57] ABSTRACT

A communication node, for use in an inter-processor communication system in an asynchronous transfer mode switching system, provides two independent paths to upper layer switching modules for two duplicated processors, respectively, wherein the path from the processor to the upper layer switching modules includes the communication node, a node switching device, all devices are duplicated and operate by using an active and stand-by scheme, data transmitted is transmitted in the unit of a data packet and the data packet includes an information field, a node address field and a payload type field for representing whether data is switching inforamtion or not. The node comprises two subnodes controlled by the controller for the active and the stand-by processors, respectively. Each subnode has two buffers for storing received data and sending data. Two received data are stored in corresponding two buffers from the node switching device through a dividing unit depending on the payload type field and transferred to corresponding processor, respectively. The two sending data are stored in corresponding two buffers and transferred to the node switching device through the selector. The node switching device receives and transfers the data from and to the upper layer switching modules.

6 Claims, 3 Drawing Sheets

ADAPTIVE COMMUNICATION NODE FOR USE IN AN INTER-PROCESSOR COMMUNICATIONS SYSTEM

FIELD OF THE INVENTION

The present invention relates to an asynchronous transfer mode switching system; and, more particularly, to an adaptive communication node capable of providing two independent paths for two duplicated processors, respectively, for use in an inter-processor communications system.

BACKGROUND OF THE INVENTION

In an electronic switching system, three main techniques, i.e., modularization technique, redundancy technique and duplication technique, are used in combination to improve operational reliability and extend functional performances, wherein a number of processors performing a variety of functions are involved therein and practical and useful cooperations among the processors are achieved by using an inter-processor communications (IPC) network.

In such an electronic switching system based on the IPC network, there are employed nodes at some intermediate points of the IPC network in order to route and arbitrate a data flow among processors.

Especially, in an asynchronous transfer mode (ATM) switching system, IPC data is transmitted in the unit of a data packet, i.e., a cell, through an ATM switching module. The data packet includes an information field and a header containing a node address and a payload type field that represents the type of inforamtion in the inforamtion field.

Referring to FIG. 1, there is depicted a schematic block diagram of two conventional IPC paths for two duplicated processors in an ATM switching system.

A first processor 10, a first node 20, a first controller 40, a first node switching block 30 and a first upper layer ATM switching module (not shown) are duplicated to make a second processor 50, a second node 60, a second controller 80, a second node switching block 70 and a second upper layer ATM switching module (not shown), respectively. All duplicated functional units including the upper layer ATM switching modules operate based on an active and stand-by mode scheme.

Each of the first and the second nodes is connected to its corresponding node switching block and controller, while the processors and the upper layer ATM switching modules are cross-linked to the nodes 20 and 60 and node switching blocks 30 and 70, respectively, wherein connections of the nodes except for the first node 20 and the second node 60 are not shown for the sake of simplicity.

In this case, the first functional units 10, 20, 30 and 40 are assumed to be in an active mode and the second functional units 50, 60, 70 and 80 are assumed to be in a stand-by mode.

The first node switching block 30 receives and transmits IPC data from and to an upper layer ATM switching module in the active mode. Operational details of the conventional node 20 will now be described with reference to FIGS. 1 and 2, wherein FIG. 2 depicts a detailed block diagram of the first node 20.

The IPC data from the first node switching block 30 is written to a receiving first-in-first-out (FIFO) buffer 120 on a cell-by-cell basis. The first controller 40 checks whether a complete data packet is written to the receiving FIFO buffer 120. When the complete data packet is written to the receiving FIFO buffer 120, the first controller 40 makes a lower link interface block 110 read the data packet in the receiving FIFO buffer 120 and send the IPC data packet to the first and the second processors 10 and 50.

The active first processor 10 receives the IPC data packet from the lower link interface block 110 and processes the IPC data packet received.

After processing the IPC data packet, the first processor 10 sends a processed IPC data packet (PIPCD) to the two duplicated nodes 20 and 60. Since the first node 20 is in the active mode, the first node 20 receives the PIPCD at the lower link interface block 110.

The lower link interface block 110 detects a busy terminal, i.e., a terminal coupled to the active processor 10, receives the PIPCD from the busy terminal and writes the PIPCD to a sending FIFO buffer 130.

When the complete data packet of the PIPCD written in the sending FIFO buffer 130 is checked by the first controller 40, the first controller 40 makes the first node switching block 30 receive the PIPCD from the first node 20 and send the PIPCD to the first and second upper layer ATM switching modules.

As described above, since such a node configuration described above provides only one path for the two duplicated processors to the upper layer ATM switching module, when the ATM switching system wants to improve or change the program in the processor to improve function thereof, there is no other path through which a new program can be received, i.e., no other path independent from a switching path through which the switching information is transmitted.

Until now, therefore, in order to change or improve the program in the processor, one of the following two conventional methods has usually been employed. In a first method, an operator first disconnects the path from the data processing block to the upper layer ATM switching module and then change or improve the program in the data processing block directly. In a second method, a new program, i.e., an improved or changed version of an old program, is transmitted to the active data processing block through the switching path in a same way as ordinary IPC data, and the active data processing block sends the new program to the stand-by data processing block through the duplication control path (not shown). When all the new program is received, the active and the stand-by modes of the functional blocks are switched, thereby the active mode block becoming a stand-by mode block and the stand-by mode block becoming an active mode block. The new program installed in the active mode block, which was in the stand-by mode previously, will be copied into the stand-by mode block, which was in the active mode before.

In the first method, it need stop the switching operation while new program is received. On the other hand, in the second method, the switching operation need not be stopped, but since the path is commonly used to switch the ordinary IPC data and to receive the new program data, the operation time of the switching function will be delayed and an overflow in the payload that causes a malfunction of the ATM switching system will be transmitted to the processor or the path.

SUMMARY OF THE INVENTION

It is, therefore, the primary object of the present invention to provide an adaptive duplicated node capable of providing two independent paths for two duplicated processors, respectively, for use in an inter-processor communication system.

A communication node, for use in an inter-processor communication system in an asynchronous transfer mode switching system, for providing two independent paths to upper layer switching modules for two duplicated processors, respectively, wherein the path from the processor to the upper layer switching modules includes the communication node, a node switching device, the node switching devices is connected to N number of nodes, N is a positive integer, two duplicated processors, two communication nodes and two upper layer switching modules operate by using an active and stand-by scheme, data transmitted between the processor and upper layer switching modules is transmitted in the unit of a data packet and the data packet includes a information field, a node address field and a payload type field for representing whether the data is switching information or not, which comprising a first receiving and sending means for receiving data from the active processor, sending said data to a selecting means when the controller identifies the one complete data packet is stored therein, receiving data from a dividing means and sending said data to the active processor when the controller identifies the one complete data packet is stored therein; a second receiving and sending means for receiving data from the stand-by processor, sending said data to a selecting means when the controller identifies the one complete data packet is stored therein, receiving data from a dividing means and sending said data to the stand-by processor when the controller identifies the one complete data packet is stored therein; a selecting means for receiving a selecting signal from the controller, selecting one of two input terminals coupled to the first receiving and sending means and the second receiving and sending means and providing the selected input data to an interfacing means; a dividing means for receiving data from the upper layer switching modules, checking the payload type field and providing said data to the first receiving and sending means and second receiving and sending means depending the payload type field; and an interfacing means for receiving data from the two duplicated upper layer switching modules, sending said data to the to the dividing means, receiving data from the selecting means and sending said data to the two duplicated upper layer switching modules.

BRIEF DESCRIPTION OF THE DRAWINGS

The above and other objects and features of the present invention will become apparent from the following description of preferred embodiments given with reference to the accompanying drawings, in which.

DETAILED DESCRIPTION OF THE PREFERRED EMBODIMENT

Figure 1:
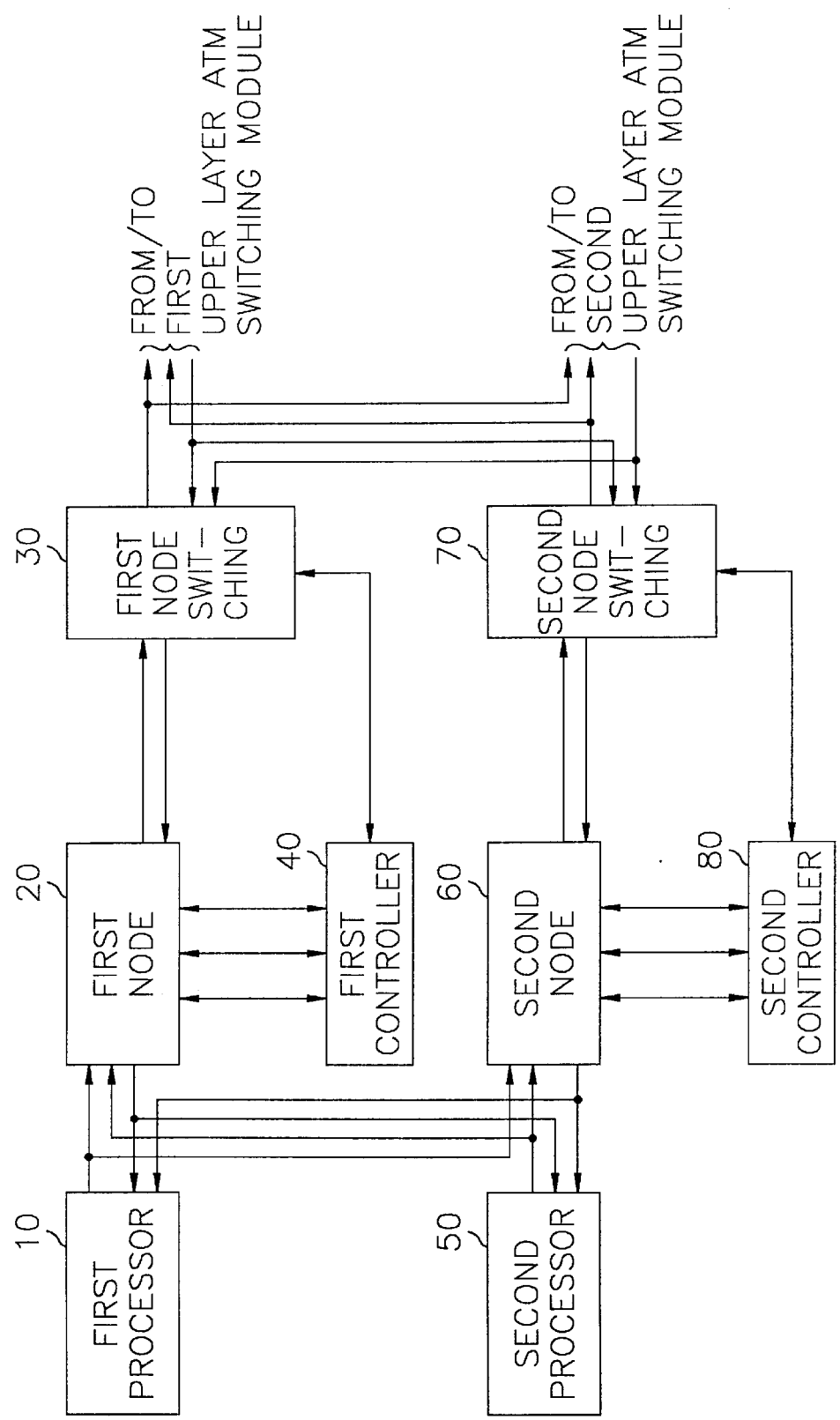
FIG. 1 shows a schematic block diagram of two conventional communication nodes connected to two duplicated processors in an IPC system.
Figure 2:
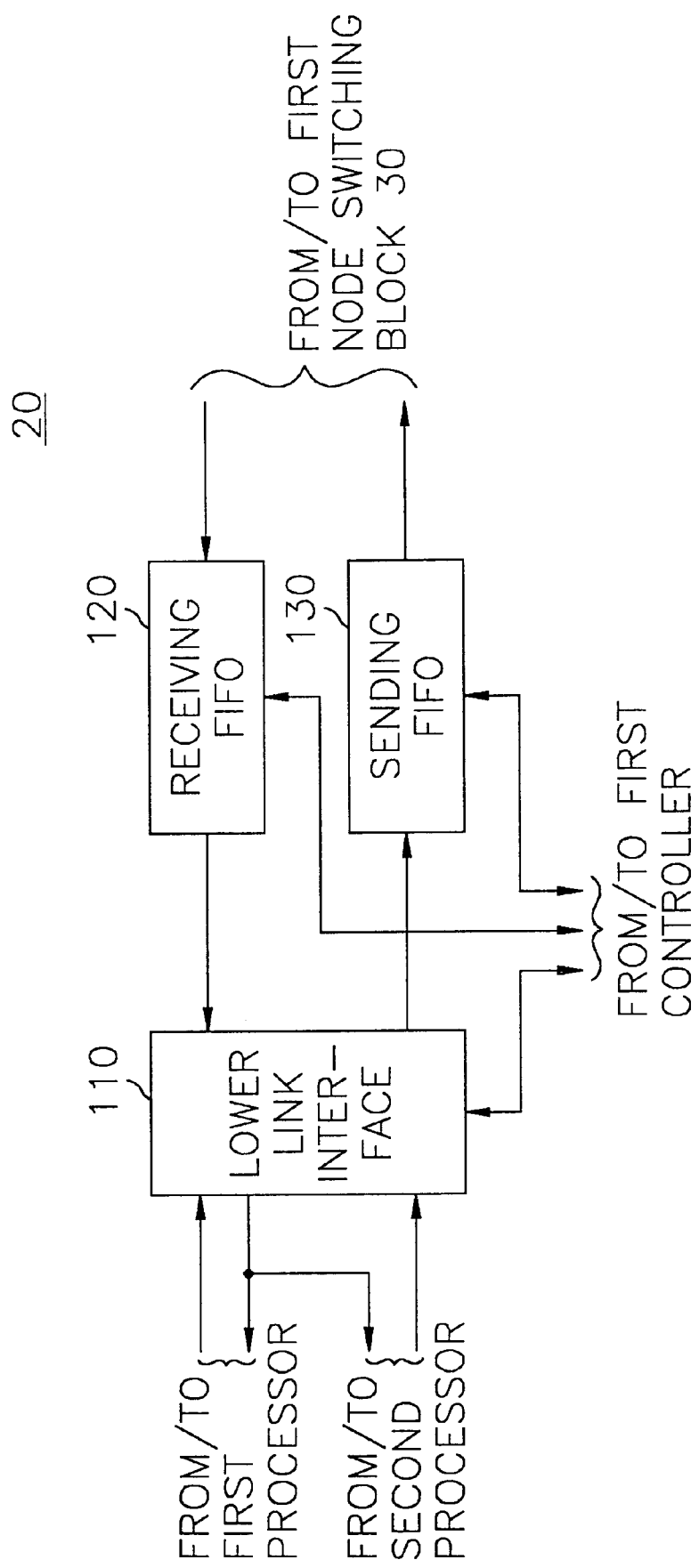
FIG. 2 depicts a detailed block diagram of a first node in FIG. 1.
Figure 3:
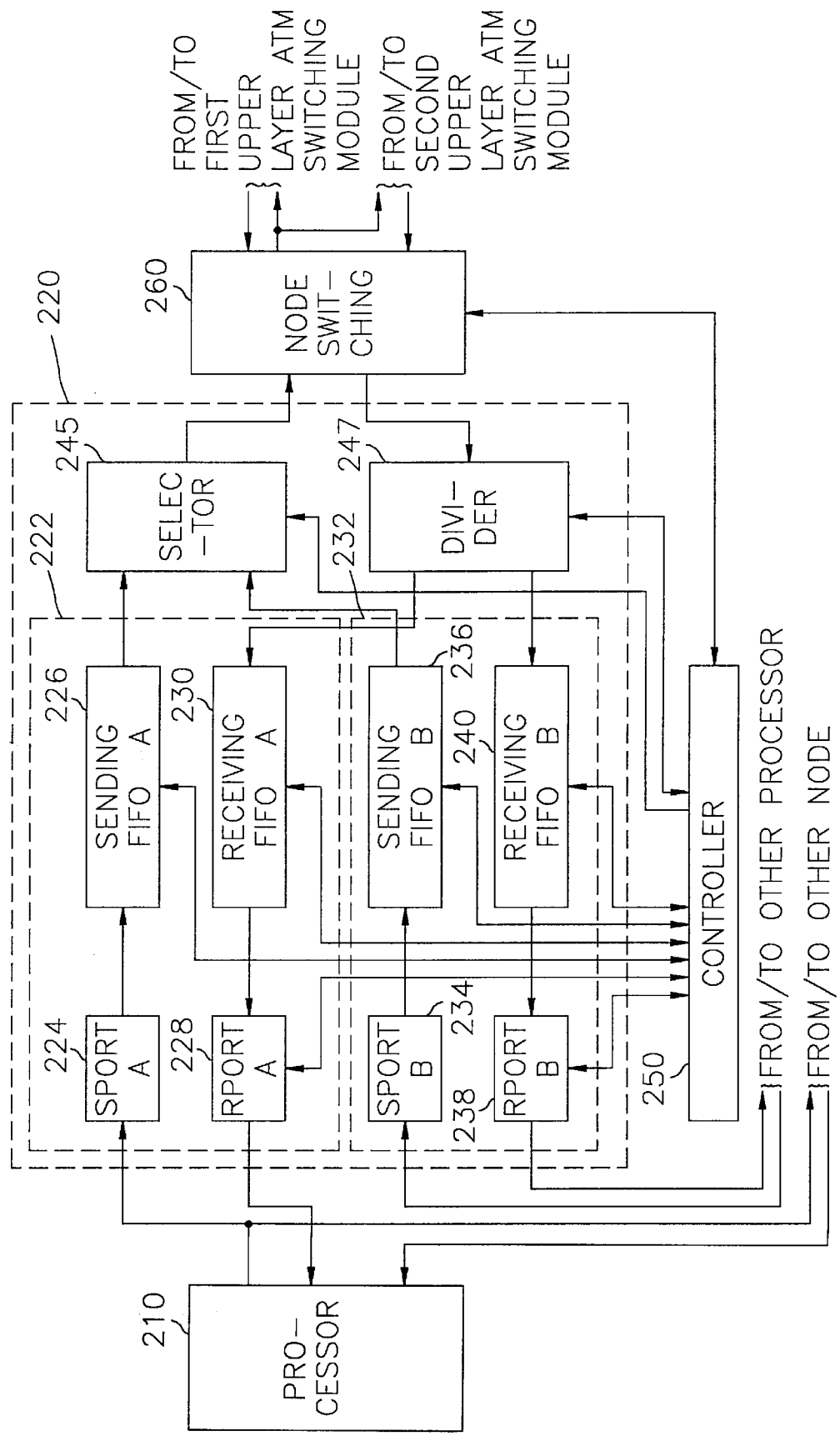
FIG. 3 illustrates a schematic block diagram of a communication node for one of duplicated processors in the IPC system in accordance with the present invention.

Referring to FIG. 3, there is depicted a schematic block diagram of an adaptive communication node for one of duplicated processors in an inter-processor communications (IPC) system for use in an asynchronous transfer mode switching system in accordance with an embodiment of the present invention.

A processor 210, a node 220, a controller 250 and a node switching block 260 are connected to form one of two duplicated functional blocks, wherein the node 220 represents N number of identical nodes(not shown for the sake of simplicity) in the connection.

All duplicated functional blocks are operated based on an active and stand-by mode scheme. In this embodiment of the present invention, it is assumed that the processor 210, the node 220, the controller 250 and the node switching block 260 are in an active mode and the other duplicated functional blocks (not shown) are in a stand-by mode.

When IPC data is inputted from an active upper layer ATM switching module (not shown), the node switching block 260 detects a busy terminal between two input terminals connected to two duplicated upper layer ATM switching modules, a first and a second, respectively, and receives the IPC data from the busy terminal, wherein a data packet of the IPC data includes an information field and a header field containing a node address and a payload type field which represents the type of the inforamtion in the inforamtion field.

The node switching block 260 compares a node address included in the IPC data with a node address data stored in the controller 250 and sends the IPC data to a corresponding node, e.g., the node 220 in this case, whose address matches with the node address in the IPC data received.

The IPC data received in the node 220 is inputted to a divider 247. The divider 247 checks a payload type bits in the IPC data and identifies the data packet type whether the IPC data includes switching information or data of new program, wherein the switching information is IPC data without data of new control program.

After checking the payload type bits, if the IPC data includes the switching information, the divider 247 sends the IPC data to an active subnode, i.e., a subnode 222 in this case, in response to a signal representing an active part and a stand-by part issued from the controller 250 to the divider 247.

Since a subnode A 222 is assumed to be the active part in this embodiment, the divider 247 writes the IPC data to a receiving first-in-first-out (FIFO) buffer A 230.

After a complete data packet of the IPC data is written in the receiving FIFO buffer A 230, the controller 250 makes an RPORT A 228 read the IPC data in the receiving FIFO buffer A 230 and send the IPC data read to an active processor, i.e., the processor 210.

On the other hand, if the IPC data includes the data of the new control program, the divider 247 writes the IPC data to a stand-by part receiving FIFO buffer, e.g., a receiving FIFO buffer B 240 in a subnode B 232.

In a similar way to the case for the IPC data including the switching information, after a complete data packet of the IPC data, i.e., the data of the new control program, is written in the receiving FIFO buffer B 240, the controller 250 makes an RPORT B 238 read the IPC data in the receiving FIFO buffer B 240 and send the read IPC data to a stand-by processor, i.e., the other processor (not shown).

Back to the case of the switching information, the processor 210 processes the IPC data by using a control program therein and provides the processed IPC data (PIPCD) to the two duplicated nodes, but since the node 220 is in the active mode and the other node(not shown) is not, the PIPCD is received by the node 220 at an SPORT A 224. The SPORT A 224 writes the PIPCD to a sending FIFO buffer A 226.

To the contrary, in the case of the IPC data including the data of the new control program, the other processor(not shown) replaces a previous control program with a new control program in the IPC data inputted from the RPORT B 238. The other processor (not shown) sends the data of the new control program to the active processor 210 through a duplication control path (not shown).

In this procedure, the other processor may check the control program data packet and may provide a data state of the IPC data including the new control program to the SPORT B 234 in the unit of a data packet of the IPC data, wherein the data state indicates whether the control program data packet has error bits or not. The SPORT B 234 writes the PIPCD to a sending FIFO buffer B 236.

When the complete data packet of the PIPCD is written in the sending FIFO buffer A 226 or the complete data packet of the data state is written in the sending FIFO buffer B 236, the controller 250 provides a selector 245 with a selection signal.

In response to the selection signal from the controller 250, the selector 245 selects one of the two input terminals coupled to the sending FIFO buffer A 226 and the sending FIFO buffer B 236. The selector 245 receives selected data at the input terminal selected by the controller 250 and provides the selected data to the node switching block 260.

The node switching block 260 receives the selected data from N number of nodes by turns under the control of the controller 250 and provides the selected data to the two upper layer ATM switching modules to transfer the selected data to other device.

As described above, a communications path for an active processor, the first processor 210 in this embodiment, and a communications path for a stand-by processor, the second processor in this embodiment, are independent from each other. If the stand-by part need communicate with the upper layer ATM switching module, e.g., for changing or improving the control program in the processor, the stand-by processor will have an access to a communications path independent from the active processor's path.

While the present invention has been described with respect to the preferred embodiments, other modifications and variations may be made without departing the scope and spirit of the present invention as set forth in the following claims.

What is claimed is:

1. A communication node, for use in an inter-processor communications system in an asynchronous transfer mode switching system, for providing two independent paths to two upper layer switching modules for two duplicated processors, respectively, wherein a path from each processor to the two upper layer switching modules includes the communication node, a controller, and a node switching device, the node switching devices being connected to N number of nodes, N being a positive integer, and two duplicated processors, two communication nodes and two upper layer switching modules are operated based on an active and stand-by mode scheme, data transmitted between the processor and the two upper layer switching modules being transmitted in the unit of a data packet, the data packet including an information field, a node address field and a payload type field for representing whether the data is switching information or not, which comprising:

a first receiving and sending means for receiving data from an active processor, sending said data to a selecting means when the controller confirms that a complete data packet is received and stored therein, receiving data from a dividing means and sending said data to the active processor when the controller confirms that a complete data packet is received and stored therein;

a second receiving and sending means for receiving data from a stand-by processor, sending said data to a selecting means when the controller confirms that a complete data packet is received and stored therein, receiving data from a dividing means and sending said data to the stand-by processor when the controller confirms that a complete data packet is received and stored therein;

the selecting means for receiving a selecting signal from the controller, selecting one of two input terminals coupled to the first receiving and sending means and the second receiving and sending means and providing the selected input data to an interfacing means;

the dividing means for receiving data from the upper layer switching modules, checking the payload type field and providing said data to either one of the first receiving and sending means and second receiving and sending means depending the payload type field; and the interfacing means for receiving data from the two duplicated upper layer switching modules, sending said data to the the dividing means, receiving data from the selecting means and sending said data to the two duplicated upper layer switching modules.

2. A communication node of claim 1, wherein the positive integer N is 4.

3. A communication node of claim 1, wherein the first receiving and sending means including:

a first port for receiving the data from one of the two duplicated processors and writing the data to a first storing means;

the first storing means for storing said data from the first port;

a second storing means for storing the data from the dividing means; and a second port for receiving said data from the second storing means when the controller confirms that a complete data packet is received and stored in the second storing means and sending the data to the other processor.

4. A communication node of claim 1, wherein the second receiving and sending means including:

a third port for receiving the data from one of the two duplicated processors and writing the data to a third storing means;

the third storing means for storing said data from the third port;

a fourth storing means for storing the data from the dividing means; and a fourth port for receiving said data from the fourth storing means when the controller confirms that a complete data packet is received and stored in the fourth storing means and sending the data to the second processor.

5. A communication node of the claim 3, wherein the first storing means, the second storing means, the third storing means and the fourth storing means are first-in-first-out buffers.

6. A communication node of the claim 4, wherein the first storing means, the second storing means, the third storing means and the fourth storing means are first-in-first-out buffers.

* * * * *